(12) United States Patent
Romanov

(10) Patent No.: US 11,746,669 B1
(45) Date of Patent: Sep. 5, 2023

(54) BLADE OUTER AIR SEAL COOLING ARRANGEMENT

(71) Applicant: Raytheon Technologies Corporation, Farmington, CT (US)

(72) Inventor: Dmitriy A. Romanov, Portland, ME (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/960,533

(22) Filed: Oct. 5, 2022

(51) Int. Cl.
    *F01D 11/08* (2006.01)
    *F01D 25/12* (2006.01)

(52) U.S. Cl.
    CPC .............. *F01D 11/08* (2013.01); *F01D 25/12* (2013.01); *F05D 2240/11* (2013.01)

(58) Field of Classification Search
    CPC ....... F01D 11/08; F01D 25/12; F05D 2240/11
    See application file for complete search history.

(56) References Cited

U.S. PATENT DOCUMENTS

| | | | |
|---|---|---|---|
| 9,784,125 B2 | 10/2017 | Duguay et al. | |
| 10,533,454 B2 | 1/2020 | Synnott et al. | |
| 10,634,010 B2* | 4/2020 | Blaney | F01D 25/246 |
| 10,794,206 B2* | 10/2020 | Blaney | F01D 25/246 |
| 2019/0218925 A1 | 7/2019 | Garay et al. | |
| 2020/0072084 A1* | 3/2020 | Blaney | F01D 25/246 |
| 2020/0072127 A1* | 3/2020 | Blaney | F01D 11/08 |

* cited by examiner

*Primary Examiner* — Eldon T Brockman
(74) *Attorney, Agent, or Firm* — Carlson, Gaskey & Olds, P.C.

(57) ABSTRACT

A blade outer air seal includes a blade outer air seal body having a radially inward facing web to be centered on a rotational axis of an associated engine. The blade outer air seal has a leading edge and a trailing edge and there is a leading edge mount hook and a trailing edge mount hook. A cooling air inlet in the leading edge mount hook communicates with a source of cooling air. The web is intermediate the leading edge mount hook and the trailing edge mount hook and the cooling air inlet communicating with a cooling air circuit in the web. Air passes from the leading edge toward the trailing edge and then to an outlet extending radially outwardly and into a central chamber defined between the leading edge mount hook and the trailing edge mount hook. The outlet is upstream of the trailing edge mount hook.

20 Claims, 3 Drawing Sheets

BLADE OUTER AIR SEAL COOLING ARRANGEMENT

BACKGROUND OF THE INVENTION

This application relates to a gas turbine engine with a blade outer air seal having a cooling arrangement.

Gas turbine engines are known, and typically include a fan delivering air into a bypass duct as propulsion air. The fan also delivers air into a compressor. The compressor compresses the air and delivers it downstream into a combustor. The compressed air is mixed with fuel and ignited in the combustor. Products of this combustion pass downstream over turbine rotors driving them to rotate. The turbine rotors in turn cause the compressor and fan rotors to rotate.

The products of combustion downstream of the combustor are extremely hot, thus, there is a cooling function that is typically provided to several components in the turbine section.

The turbine section typically includes alternate rows of static vanes and rotating blades. Blade outer air seals ("BOAS") are typically positioned radially outwardly of an outer blade tip of the rotor blades. This reduces leakage around the turbine blades, and improves the efficiency of the gas turbine engine.

Cooling is provided to the blade outer air seals, particularly at upstream rows in the turbine section. There are also seals provided to seal between the blade outer air seal and adjacent surfaces such as a static vane row.

SUMMARY OF THE INVENTION

In a featured embodiment, a blade outer air seal includes a blade outer air seal body having a radially inward facing web to be centered on a rotational axis of an associated engine. The blade outer air seal has a leading edge and a trailing edge and there is a leading edge mount hook and a trailing edge mount hook. A cooling air inlet in the leading edge mount hook communicates with a source of cooling air. The web is intermediate the leading edge mount hook and the trailing edge mount hook and the cooling air inlet communicating with a cooling air circuit in the web. Air passes from the leading edge toward the trailing edge and then to an outlet extending radially outwardly and into a central chamber defined between the leading edge mount hook and the trailing edge mount hook. The outlet is upstream of the trailing edge mount hook.

In another embodiment according to the previous embodiment, the leading edge mount hook has a radially enlarged central pillar that includes the cooling air inlet, and has a first seal between the central pillar and to seal against mount structure at the leading edge.

In another embodiment according to any of the previous embodiments, there is a second seal between the central pillar and to seal against a static vane upstream of the leading edge mount hook.

In another embodiment according to any of the previous embodiments, the leading edge mount hook has radially smaller seal seat portions on an upstream end of the central pillar and on a downstream end of the central pillar and an upstream space is defined between the upstream radially smaller seal seat portion and an upstream side of the central pillar. The upstream space receives the second seal. A downstream space is defined between a downstream side of the central pillar, and the radially smaller seal seat portion, and downstream space receiving the first seal.

In another embodiment according to any of the previous embodiments, the first and second seals are W seals.

In another embodiment according to any of the previous embodiments, the W seals are formed of sheet metal.

In another embodiment according to any of the previous embodiments, a partial feather seal is positioned at the trailing edge, and within the trailing edge mount hook.

In another embodiment according to any of the previous embodiments, a heat shield is positioned on a radially outer surface of the web.

In another featured embodiment, a gas turbine engine includes a compressor section and a turbine section. The turbine section has at least one rotating blade row. A blade outer air seal assembly has a radially inward facing web centered on a rotational axis of the at least one blade row, and positioned outwardly of a blade radially outer tip of the blades in the at least one blade row. The blade outer air seal has a leading edge and a trailing edge and there is a leading edge mount hook mounted on mount structure and a trailing edge mount hook mounted on the mount structure. A cooling air inlet in the leading edge mount hook communicates with a source of cooling air. The web is intermediate the leading edge mount hook and the trailing edge mount hook and the cooling air inlet communicating with a cooling air circuit in the web. Air passes from the leading edge toward the trailing edge and then to an outlet extending radially outwardly and into a central chamber defined between the leading edge mount hook and the trailing edge mount hook. The outlet is upstream of the trailing edge mount hook.

In another embodiment according to any of the previous embodiments, the leading edge mount hook has a radially enlarged central pillar that includes the cooling air inlet, and has a first seal between the central pillar and the mount structure at the leading edge.

In another embodiment according to any of the previous embodiments, there is a second seal between the central pillar and a static vane positioned upstream of the leading edge mount hook.

In another embodiment according to any of the previous embodiments, the leading edge mount hook has radially smaller seal seat portions on an upstream end of the central pillar and on a downstream end of the central pillar and an upstream space is defined between the upstream radially smaller seal seat portion and an upstream side of the central pillar. The upstream space receives the second seal. A downstream space is defined between a downstream side of the central pillar, and the downstream radially smaller seal seat portion, and the downstream space receiving the first seal.

In another embodiment according to any of the previous embodiments, the first and second seals are W seals.

In another embodiment according to any of the previous embodiments, the W seals are formed of sheet metal.

In another embodiment according to any of the previous embodiments, a partial feather seal is positioned at the trailing edge, and within the trailing edge mount hook.

In another embodiment according to any of the previous embodiments, a heat shield is positioned on a radially outer surface of the web.

In another embodiment according to any of the previous embodiments, air from the outlet passes into the central chamber, and then circumferentially and into a core airflow path through gaps between the blade outer air seal and an adjacent blade outer air seal segment.

In another embodiment according to any of the previous embodiments, air from the outlet passes into the central chamber, and then circumferentially and into a core airflow path through gaps between the blade outer air seal and an adjacent blade outer air seal segment.

In another embodiment according to any of the previous embodiments, the source of cooling air is the compressor section.

In another embodiment according to any of the previous embodiments, the source of cooling air is the compressor section.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
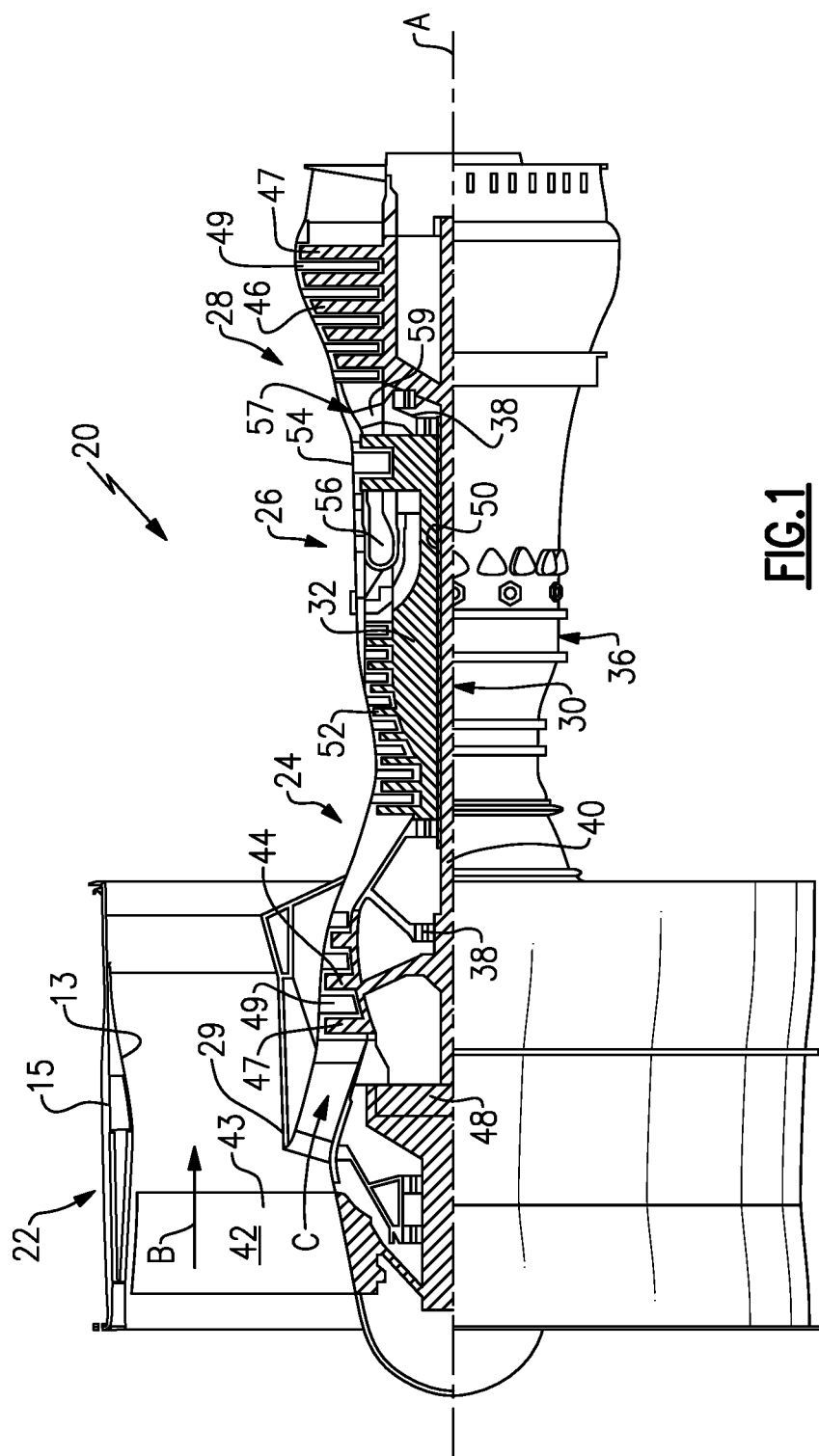
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

Figure 2:
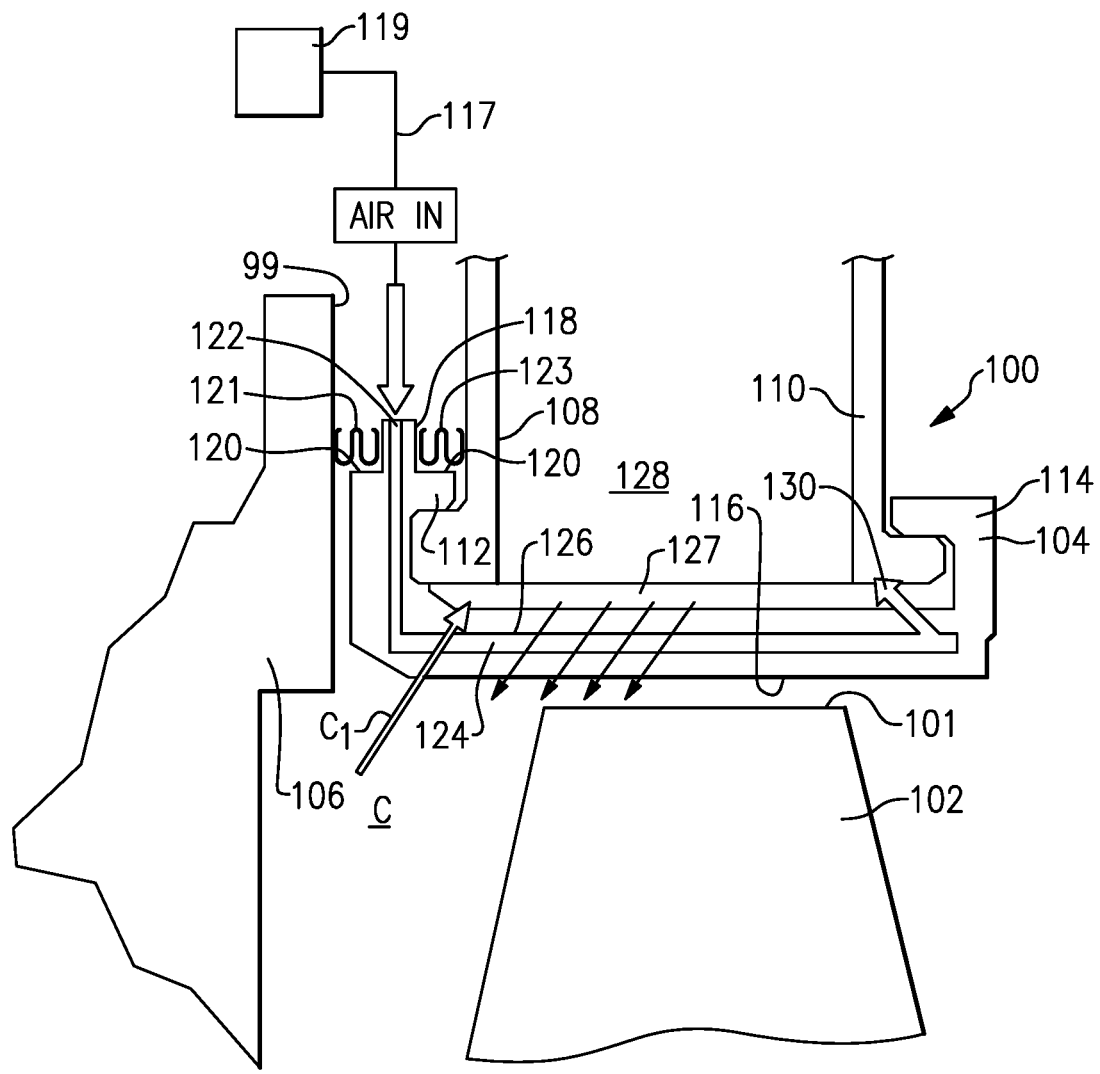
FIG. 2 shows features of a blade outer air seal and turbine blade.

FIG. 2 shows a blade outer air seal assembly 100. The blade outer air seal 104 ("BOAS") has a radially inner central web 116 positioned radially outward of an outer tip 101 of the turbine blade 102. It should be understood that there are a plurality of turbine blades 102 in a row, and that the blade outer air seal 104 is provided by circumferentially spaced segments which extend over the bulk of 360 degrees about a rotational axis of the turbine blades 102. The BOAS 104 sits adjacent an upstream static vane row 106. Mount structure 108 receives an upstream mount hook 112 and a downstream mount structure 110 receives a downstream mount hook 114 of the BOAS 104.

A fluid supply 117 receives cooling air from a source, such as a compressor 119 in an associated gas turbine engine. Line 117 communicates air into a passage 122, and then into a cooling air circuit 124 which flows along a length of blade outer air seal body 104 toward the downstream end. The circuit 124 is formed in web 126.

As shown, the leading edge or forward mount hook 112 has a central pillar portion 118 and side seat portions 120. A seal 121 is positioned between the pillar 118 and a surface 99 of the vane 106. The seal 121 sits within a space created by the smaller seal seat 120. Similarly, a seal 123 sits in a space provided at a downstream end of the pillar 118 and by the seal seat portion 120. This seals against the mount structure 108.

In embodiments, the seals 121 and 123 may be so called W seals. Such seals are known and may be formed of sheet metal.

A heat shield 127 is positioned radially outwardly of the central web 126. A central chamber 128 is formed between the mount hooks 112 and 114. An exit 130 from the circuit 124 leads into chamber 128. The heat shield may be made of a heat resistance stainless steel material. In one embodiment, it could be made from INCONEL®.

Figure 3A:
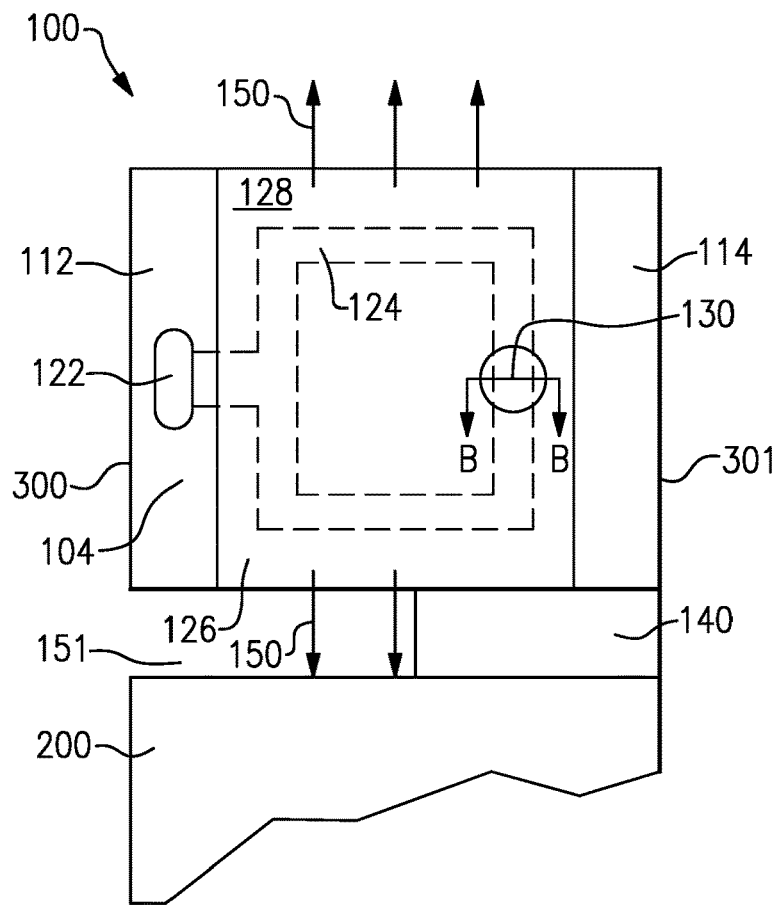
FIG. 3A schematically shows a cooling air flow circuit for the FIG. 2 blade outer air seal.

As shown in FIG. 3A, one can see one or more openings to passage(s) 122 is formed in the forward mount hook 112. Cooling circuit 124 is shown schematically. From chamber 128 the air exits as shown at 150 into gaps 151 between the BOAS segment 104 and an adjacent BOAS segment 200. A partial feather seal 140 limits the gap 151. The width of the gap 151 is exaggerated to better illustrated the function. As shown BOAS 104 has a leading edge 300 and a trailing edge 301.

Figure 3B:
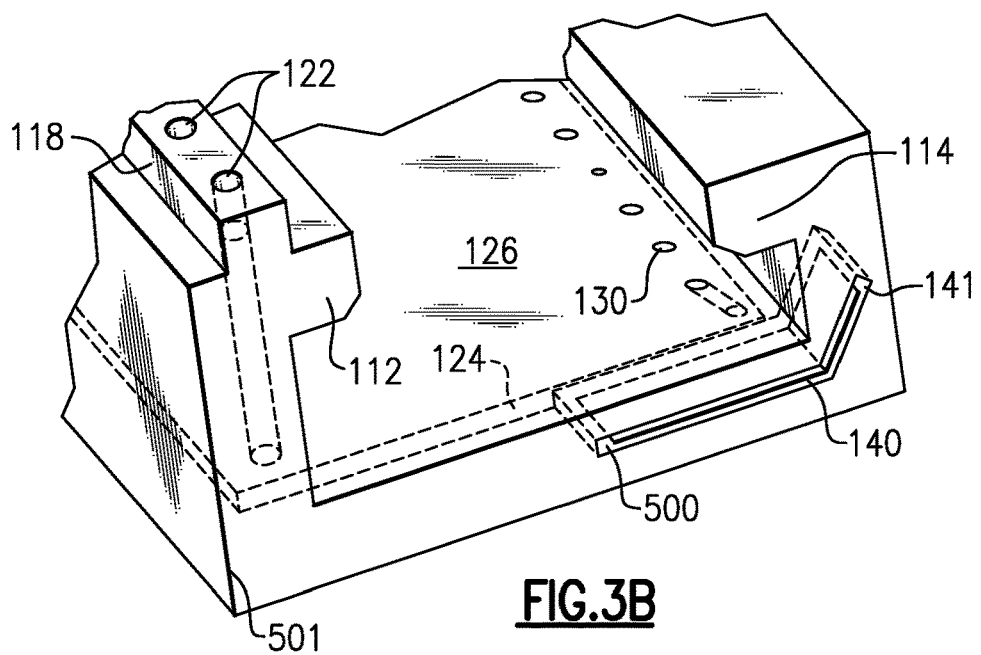
FIG. 3B shows a further detail along line B-B of FIG. 3A.

FIG. 3B shows an end view of the BOAS 104. As can be seen, pillar 118 includes a plurality of inlets 122. The circuit 124 extends through the web 126 to the outlets 130.

A feather seal 140 is shown in a feather seal groove 141. As shown, feather seal 140 has a forwardmost end 500 that is spaced rearwardly from leading edge 501, leaving a gap 151, as explained above. In this sense the feature seal 140 could be seen as a "partial feather seal." As known, the feather seal would extend across a circumferential gap between edges of one BOAS into a feather seal groove in an adjacent BOAS.

While the circuit 124 is shown schematically, any number of circuits can be utilized including axially flowing cooling channels such as microcircuits, brick and mortar circuits, and other type channels.

The blade outer air seal body may be formed of an appropriate ceramic matrix composite ("CMC"), a single crystal alloy or other appropriate material.

In the prior art, cooling air supply has been generally initially supplied into the central chamber 128. Compressed air is at a high pressure. Thus, there is a pressure differential between the chamber 128 and radially inward of the web 116 in the prior art. This pressure differential becomes particularly great at the trailing edge of the prior art of the blade outer air seals.

With the disclosed arrangement there is no need for a seal at the trailing edge. Further, the seals 121 and 123 are moved outwardly of the path of the products of combustion C. As shown at Cl in FIG. 2, some of those products may leak around through the gap 151 and into the chamber 128. Heat shield 144 protects the BOAS body 104 from this high temperature gas.

By only having the cooling air flow through the small passage 122, and then the circuit 124, the pressurized air is acting over a much smaller surface area.

In the prior art, there is a relatively high pressure differential between the chamber 128 and the flow path C. This becomes particularly pronounced at the trailing edge after the products of combustion C have been expanded across the blade 102. Further, because of this, there is a reduced thermal gradient across the blade outer air seal 104, and a reduction in thermal mechanical fatigue.

A blade outer air seal under this disclosure could be said to include a blade outer air seal body having a radially inward facing web to be centered on a rotational axis of an associated engine. The blade outer air seal has a leading edge and a trailing edge and there is a leading edge mount hook and a trailing edge mount hook. A cooling air inlet in the leading edge mount hook communicates with a source of cooling air. The web is intermediate the leading edge mount hook and the trailing edge mount hook and the cooling air inlet communicating with a cooling air circuit in the web.

Air passes from the leading edge toward the trailing edge and then to an outlet extending radially outwardly and into a central chamber defined between the leading edge mount hook and the trailing edge mount hook. The outlet is upstream of the trailing edge mount hook.

A gas turbine engine under this disclosure could be said to include a compressor section and a turbine section. The turbine section has at least one rotating blade row. A blade outer air seal assembly has a radially inward facing web centered on a rotational axis of the at least one blade row, and is positioned outwardly of a blade radially outer tip of the blades in the at least one blade row. The blade outer air seal has a leading edge and a trailing edge and there is a leading edge mount hook mounted on mount structure and a trailing edge mount hook mounted on the mount structure. A cooling air inlet in the leading edge mount hook communicates with a source of cooling air. The web is intermediate the leading edge mount hook and the trailing edge mount hook and the cooling air inlet communicating with a cooling air circuit in the web. Air passes from the leading edge toward the trailing edge and then to an outlet extending radially outwardly and into a central chamber defined between the leading edge mount hook and the trailing edge mount hook. The outlet is upstream of the trailing edge mount hook.

Although embodiments are disclosed, a worker of ordinary skill in this art would recognize that modifications would come within the scope of this disclosure. For that reason, the following claims should be studied to determine the true scope and content of this disclosure.

What is claimed is:

1. A blade outer air seal comprising:
   a blade outer air seal body having a radially inward facing web to be centered on a rotational axis of an associated engine, said blade outer air seal having a leading edge and a trailing edge and there being a leading edge mount hook and a trailing edge mount hook;
   a cooling air inlet in said leading edge mount hook, to communicate with a source of cooling air, the web intermediate the leading edge mount hook and the trailing edge mount hook and the cooling air inlet communicating with a cooling air circuit in the web, and air passing from the leading edge toward the trailing edge and then to an outlet extending radially outwardly and into a central chamber defined between the leading edge mount hook and the trailing edge mount hook, and said outlet being upstream of said trailing edge mount hook.

2. The blade outer air seal as set forth in claim 1, wherein said leading edge mount hook having a radially enlarged central pillar that includes said cooling air inlet, and having a first seal between said central pillar and to seal against mount structure at the leading edge.

3. The blade outer air seal as set forth in claim 2, wherein there is a second seal between said central pillar and to seal against a static vane upstream of said leading edge mount hook.

4. The blade outer air seal as set forth in claim 3, wherein said leading edge mount hook has radially smaller seal seat portions on an upstream end of said central pillar and on a downstream end of said central pillar and an upstream space is defined between said upstream radially smaller seal seat portion and an upstream side of said central pillar, and said upstream space receiving said second seal, wherein a downstream space defined between a downstream side of said central pillar, and said radially smaller seal seat portion, and downstream space receiving said first seal.

5. The blade outer air seal as set forth in claim 4, wherein said first and second seals are W seals.

6. The blade outer air seal as set forth in claim 5, wherein said W seals are formed of sheet metal.

7. The blade outer air seal as set forth in claim 1, wherein a partial feather seal is positioned at the trailing edge, and within the trailing edge mount hook.

8. The blade outer air seal as set forth in claim 1, wherein a heat shield is positioned on a radially outer surface of said web.

9. A gas turbine engine comprising:
   a compressor section and a turbine section, said turbine section having at least one rotating blade row; and
   a blade outer air seal assembly having a radially inward facing web centered on a rotational axis of said at least one blade row, and positioned outwardly of a blade radially outer tip of the blades in the at least one blade row, said blade outer air seal having a leading edge and a trailing edge and there being a leading edge mount hook mounted on mount structure and a trailing edge mount hook mounted on the mount structure; and
   a cooling air inlet in said leading edge mount hook, to communicate with a source of cooling air, the web intermediate the leading edge mount hook and the trailing edge mount hook and the cooling air inlet communicating with a cooling air circuit in the web, and air passing from the leading edge toward the trailing edge and then to an outlet extending radially outwardly and into a central chamber defined between the leading edge mount hook and the trailing edge mount hook, and said outlet being upstream of said trailing edge mount hook.

10. The gas turbine engine as set forth in claim 9, wherein said leading edge mount hook having a radially enlarged central pillar that includes said cooling air inlet, and having a first seal between said central pillar and said mount structure at the leading edge.

11. The gas turbine engine as set forth in claim 10, wherein there is a second seal between said central pillar and a static vane positioned upstream of said leading edge mount hook.

12. The gas turbine engine as set forth in claim 11, wherein said leading edge mount hook has radially smaller seal seat portions on an upstream end of said central pillar and on a downstream end of said central pillar and an upstream space is defined between said upstream radially smaller seal seat portion and an upstream side of said central pillar, and said upstream space receiving said second seal, wherein a downstream space defined between a downstream side of said central pillar, and said downstream radially smaller seal seat portion, and said downstream space receiving said first seal.

13. The gas turbine engine as set forth in claim 12, wherein said first and second seals are W seals.

14. The gas turbine engine as set forth in claim 13, wherein said W seals are formed of sheet metal.

15. The gas turbine engine as set forth in claim 14, wherein a partial feather seal is positioned at the trailing edge, and within the trailing edge mount hook.

16. The gas turbine engine as set forth in claim 14, wherein a heat shield is positioned on a radially outer surface of said web.

17. The gas turbine engine as set forth in claim 13, wherein air from the outlet passes into said central chamber, and then circumferentially and into a core airflow path through gaps between said blade outer air seal and an adjacent blade outer air seal segment.

18. The gas turbine engine as set forth in claim 9, wherein air from the outlet passes into said central chamber, and then circumferentially and into a core airflow path through gaps between said blade outer air seal and an adjacent blade outer air seal segment.

19. The gas turbine engine as set forth in claim 18, wherein said source of cooling air is said compressor section.

20. The gas turbine engine as set forth in claim 9, wherein said source of cooling air is said compressor section.

* * * * *